United States Patent Office 2,961,353
Patented Nov. 22, 1960

2,961,353

PROCESS FOR PREPARING GLUTEN AND WHEAT STARCH

Walter A. Carlson and Elliott M. Ziegenfuss, Minneapolis, Minn., assignors to General Mills, Inc., a corporation of Delaware No Drawing. Filed Sept. 28, 1956, Ser. No. 612,593

2 Claims. (Cl. 127—67)

This invention relates to an improved method for separating wheat flour into wheat gluten and wheat starch. More specifically, this invention relates to a process for effecting the above separation wherein a relatively stable and light-colored vital gluten results.

Wheat gluten contains most of the protein present in ordinary wheat flour. It is, therefore, an economical source of proteins and may be used as a protein supplement. It is especially useful in the preparation of high-protein bakery products and cereals.

The conventional and time-honored steps employed in the separation of wheat starch and gluten from wheat flour are as follows:

Step 1: Flour and water are mixed to form a dough.

Step 2: The dough is washed thoroughly with water. During this step the wheat starch and wheat gluten are separated, the wheat starch going with the wash water to form what is commonly called "starch milk" and the wheat gluten is left behind.

Step 3: The wheat starch is separated from the starch milk. The preferred method for effecting this separation is by centrifugation.

Step 4: The washed gluten is dried. This drying step may be effected by any one of a number of suitable methods. Customary methods are by vacuum drying in an oven and by flash or spray drying.

Step 5: The gluten is crushed and ground. This step may be performed in any conventional method, and, generally speaking, the particle sizes will fall within the range of 60–300 mesh.

It has now been discovered that the properties and physical characteristics of the gluten may be greatly enhanced by adjusting the pH of the water used to form the dough. Generally speaking, it has been observed that optimum pH to which the dough should be adjusted is about 7. The preferred range is, therefore, from 6.8 to 7.2. However, it has been noted that higher pH's given an equally satisfactory gluten but that the total yield of gluten diminishes at pH's higher than 7.2.

It is, therefore, the principal object of this invention to teach and disclose a novel and useful method for preparing an improved gluten product which is more stable than the gluten heretofore produced by the prior art methods. Another object of this invention is to teach a method for preparing gluten which has a light color.

Some of the advantages and unexpected results of this process are:

(1) The wheat starch is not adversely affected by the change in pH of the dough.

(2) The wheat gluten is not adversely affected in any of its physical characteristics by the increase in pH of the dough, (3) The fat content of the gluten is reduced appreciably.

Other objects and advantages to this invention will become apparent upon reading the specifications.

Various basic inorganic compounds may be used to increase the pH of the dough. Illustrative of these basic compounds are sodium hydroxide, potassium hydroxide, sodium carbonate, sodium bicarbonate, calcium hydroxide, calcium oxide, sodium hypophosphate, and other similar compounds. These basic compounds may also be characterized as being the hydroxides and oxides of the elements of groups I and II in the periodic table and salts of these compounds with weak acids. It will also be appreciated that since the ultimate pH desired is approximately 7, the water incorporated in the dough may be mixed with any substance which will neutralize the natural acidity of the flour.

This invention may be illustrated further by reference to the following examples, in which all "parts" are expressed as parts by weight, and all "percentages" are expressed as percent by weight, unless specified otherwise.

EXAMPLE I

Table I shows the results obtained by preparing wheat gluten from a wheat flour which contained 14.6% protein, 0.93% ash, and 2.1% ethyl ether extractable fat, by adjusting the pH of the dough to various levels.

The procedure employed in this example was as follows:

A. 500 grams of flour and 500 ml. of water containing the various basic substances were mixed to form a dough in a Hobart mixer.

B. The dough was allowed to stand for 15 minutes, at which time the pH of the wet dough was taken.

C. The dough was then washed with water until the wet weight of the gluten was about 220 grams.

D. The wet gluten was dried in a vacuum and then ground in a Raymond mill.

Table I

| Sample Number | Composition of Water Used to Form the Dough | pH of Dough | Gluten | | |
|---|---|---|---|---|---|
| | | | Color (Buff) | Percent Ethyl Ether Extractable Fat | Percent Protein | Weight of Recovered Vital Gluten in Grams |
| 1 | Tap water | 6.0 | medium | 1.9 | 83.5 | 67 |
| 2 | 2% Na$_3$PO$_4$ | 8.9 | very light | 1.0 | 84.0 | 53 |
| 3 | 1% Na$_2$HPO$_4$ | 6.9 | light | 0.6 | 80.5 | 66 |
| 4 | 0.5% Na$_3$PO$_4$ | 6.9 | medium | 0.9 | 82.0 | 67 |
| 5 | 0.5% Na$_2$CO$_3$ | 8.5 | very light | 0.5 | 86.0 | 50 |
| 6 | 0.12% CaCl$_2$ | 6.9 | medium | 0.7 | 82.5 | 66 |
| 7 | 0.1% CaO | 6.8 | do | 0.6 | 79.5 | 67 |
| 8 | 0.25% Na$_2$CO$_3$ | 7.2 | do | 0.6 | 80.5 | 66 |

EXAMPLE II

Table II shows the results obtained by preparing wheat gluten from a wheat flour which contained 14.7% protein and 0.92% ash by adjusting the pH of the dough with various basic compounds.

The procedure followed in this example was as follows:

A. 250 grams of flour and 250 ml. of "make up" water containing the indicated amount of alkaline solutions were mixed for about 10 minutes to form a dough.

B. The dough was permitted to stand 15 minutes and the pH of the dough was taken.

C. The dough was washed with water until the wet gluten weighed about 120 grams.

D. The wet gluten was dried overnight in an oven held at 120–125° C. under 27 inches of vacuum.

E. The dry gluten was ground in a Raymond mill using a screen having 1/32 of an inch openings.

Table II

| Sample Number | Milliliters of 0.2 N Alkali Added to the Make-up Water | pH of the Dough | Gluten | | | |
|---|---|---|---|---|---|---|
| | | | Percent Protein | Ethyl Ether Extractable Fat | Weight of Recovered Vital Gluten in Grams | Weight of 100% Protein Recovered in Grams |
| 1 | none | 5.9 | 79.0 | 1.36 | 37 | 29.2 |
| 2 | 50 ml. NaOH | 8.3 | 85.0 | 0.93 | 31 | 26.4 |
| 3 | 20 ml. NaOH | 6.7 | 79.7 | 1.23 | 37 | 29.4 |
| 4 | 50 ml. KOH | 8.3 | 86.3 | 0.85 | 31 | 26.8 |
| 5 | 20 ml. KOH | 6.6 | 79.6 | 1.25 | 38 | 30.2 |

EXAMPLE III

The procedure outlined in Example II was followed except that 2% ammonium bicarbonate and ammonium carbonate by weight of the flour were added to the make-up water. The pH's of the doughs in this instance were 8.4 and 8.3, respectively. In the case of ammonium bicarbonate, 31 grams of gluten were obtained, having a protein content of 84.3% and 1.30% of ethyl ether extractable fat. With ammonium carbonate, 29 grams of dry gluten were obtained, having a protein content of 85.3% and 1.08% of ethyl ether extractable fat.

EXAMPLE IV

Three doughs having a pH of 5.5, 5.7, and 7.3 were used to prepare vital gluten as outlined in Example II.

The resulting gluten samples were studied for stability and the peroxide content of the gluten from the dough having a pH of 7.3 was about half the peroxide content of the gluten samples from the doughs having a pH of 5.5 and 5.7.

EXAMPLE V

Gluten separated in the manner described in Example I was studied in respect to the effect of pH on the color of the gluten. Table III lists the results of these observations.

Table III

| pH of Gluten | Color of Gluten |
|---|---|
| 5.5 [1] | deep buff. |
| 6.0 | medium buff. |
| 6.4 | light buff. |
| 6.9 | Do.[2] |
| 7.6 | very light buff.[3] |
| 8.0 | Do.[3] |

[1] pH of this sample adjusted with HCl, the pH of the remaining samples were adjusted with NaOH.
[2] This sample was observed to have the lowest peroxide content.
[3] Recovery of gluten diminished with these samples.

EXAMPLE VI

Wheat flour (one part) having a weighted protein content of 14.6% and an ash content of 0.98% was mixed with tap water (0.9 part) in a dough mixer. The dough was then fed continuously to a washer-extractor at the rate of 8,000 pounds per hour and washed with 60,000 gallons of tap water per hour counter-currently to produce a wet gluten mass and starch milk.

Eight-pound portions of the wet gluten mass, which are about 2/3 water by weight, were then subjected to vacuum drying at 27 inches' vacuum and 35 pounds' steam pressure for four hours. The dry vital gluten cake was then crushed in a paddle type conveyor and ground to a particle size falling between 60 and 300 mesh in a Raymond vertical mill.

EXAMPLE VII

Vital wheat gluten was prepared in the same manner and quantities as in Example VI except that the tap water used to prepare the dough contained 0.08% NaOH based on the weight of the flour. The resulting gluten had a lighter color than the gluten from Example VI and the ethyl ether extractable fat was also appreciably reduced.

Many modifications and variations of the invention as hereinbefore set forth may be made without departing from the spirit and scope thereof, and therefore only such limitations should be imposed as are indicated in the appended claims.

Now, therefore, we claim:

1. In the process for separating wheat gluten and wheat starch from wheat flour comprising the steps of forming a dough by mixing the flour and water, washing the dough with water, separating the wheat starch from the wash water, drying the gluten and grinding the dried gluten, the improvement which comprises adjusting the pH of the dough to a pH within the range of 6.4 to 8.5 by the addition of a basic substance and thereby obtaining relatively stable light-colored gluten.

2. In the process for separating wheat gluten and wheat starch from wheat flour comprising the steps of forming a dough by mixing the flour and water, washing the dough with water, separating the wheat starch from the wash water, drying the gluten and grinding the dried gluten, the improvement which comprises adjusting the pH of the dough to a pH within the range of 6.8 to 7.2 with a basic substance and thereby obtaining relatively stable light-colored gluten.

References Cited in the file of this patent

UNITED STATES PATENTS

| 2,437,036 | Murer et al. | Mar. 2, 1948 |
| 2,455,981 | Dimler | Dec. 14, 1948 |
| 2,516,117 | Harrel et al. | July 25, 1950 |

OTHER REFERENCES

"Wheat Protein Saved," Sci. News Letter, July 3, 1943, p. 3.

American Miller and Processor, April 1944, "Wheat Flour," pp. 32, 34, 37 and 78.